(12) United States Patent
Moon et al.

(10) Patent No.: US 7,710,949 B1
(45) Date of Patent: *May 4, 2010

(54) DISTRIBUTED TELECOMMUNICATION NETWORK

(75) Inventors: Billy G. Moon, Morrisville, NC (US);
Roger B. Melton, Durham, NC (US)

(73) Assignee: Cisco Technology, Inc., San Jose, CA (US)

( * ) Notice: Subject to any disclaimer, the term of this patent is extended or adjusted under 35 U.S.C. 154(b) by 1321 days.

This patent is subject to a terminal disclaimer.

(21) Appl. No.: 11/084,487

(22) Filed: Mar. 18, 2005

Related U.S. Application Data

(63) Continuation of application No. 09/834,267, filed on Apr. 12, 2001, now Pat. No. 6,904,038.

(51) Int. Cl.
*H04L 12/64* (2006.01)
(52) U.S. Cl. ...................... 370/353; 370/356
(58) Field of Classification Search ................. 370/353, 370/356
See application file for complete search history.

(56) References Cited

U.S. PATENT DOCUMENTS

| | | | | |
|---|---|---|---|---|
| 6,011,794 | A | 1/2000 | Mordowitz et al. | 370/389 |
| 6,205,135 | B1 | 3/2001 | Chinni et al. | 370/356 |
| 6,584,094 | B2 | 6/2003 | Maroulis et al. | 370/352 |
| 6,751,210 | B1 | 6/2004 | Shaffer et al. | 370/352 |
| 6,754,181 | B1 | 6/2004 | Elliott et al. | 370/252 |
| 6,804,225 | B1 * | 10/2004 | Lang | 370/352 |
| 6,904,038 | B1 * | 6/2005 | Moon et al. | 370/353 |
| 2001/0028642 | A1 * | 10/2001 | Veschi | 370/352 |
| 2002/0037075 | A1 | 3/2002 | Flanagan | 379/201.12 |

FOREIGN PATENT DOCUMENTS

AU 200054537 B2 6/2000

* cited by examiner

*Primary Examiner*—Melvin Marcelo
(74) *Attorney, Agent, or Firm*—Baker Botts L.L.P.

(57) ABSTRACT

A telecommunication device includes a first interface coupled to the public switched telephone network (PSTN) in a first local calling area, a second interface coupled to a packet network, and a third interface coupled to a first plain old telephone system (POTS) telephony device. The device also includes a router that directs telecommunications between the first, second, and third interfaces and a gateway that enables telecommunications between the first POTS telephony device and the packet network. Furthermore, the device includes a processor that receives signaling from the first POTS telephony device indicating a desire to establish telecommunications with a second POTS telephony device coupled to the PSTN in a second local calling area and coupled to the packet network. The processor determines whether the telecommunication device has an appropriate amount of associated credit to use the packet network to establish telecommunications between the first and second POTS telephony devices and, if so, establishes telecommunications between the first and second POTS telephony devices using the packet network such that the first and second POTS telephony devices may communicate without using a long distance network coupling the first and second local calling areas.

30 Claims, 4 Drawing Sheets

FIG. 3

| USER ID | USER TELEPHONE NUMBER(S) | USER POP ADDRESS | AVAILABLE USER ACCESS TIME | ACCESS TIME RESTRICTIONS | USER ACCESS RESTRICTIONS | | DIALING RULES |
|---|---|---|---|---|---|---|---|
| rpeterson@aol.com | 214-973-4367 | 100.343.23.74 | 237 MINUTES | NO RESTRICTIONS | NO USERS FROM OTHER STATES | ooo | DIAL "9" AND LOCAL AREA CODE |
| jroberts@jr.com | 972-365-8987 | 215.309.67.34 | 0 MINUTES | WEEKENDS ONLY | NO USER RESTRICTIONS | ooo | DIAL LOCAL AREA CODE |
| pjohns@swbell.com | 206-615-3476<br>206-615-7940(*) ← 105 | 107.565.34.72 | 25 MINUTES | 10 HOURS/WEEK MAXIMUM ACCESS | ACCESS ONLY TO rpeterson@aol.com AND jroberts@jr.com | ooo | NO SPECIAL RULES |
| ooo | ooo | 302.413.98.6 | 1237 MINUTES | ooo | ooo | ooo | ooo |
| ssmith@ssmith.com | 212-405-2321 | 145.245.89.4 | 563 MINUTES | ACCESS ONLY FROM 10am-4pm AND 11pm-6am | NO ACCESS BY jroberts@jr.com | ooo | DIAL "9" |
| ↑102 | ↑104 | ↑106 | ↑108 | ↑110 | ↑112 | | ↑114 |

100 ↗

DISTRIBUTED TELECOMMUNICATION NETWORK

RELATED APPLICATIONS

This application is a continuation of U.S. application Ser. No. 09/834,267, filed Apr. 12, 2001 now U.S. Pat. No. 6,904,038 by Billy G. Moon and Roger B. Melton and entitled "Distributed Telecommunication Network".

TECHNICAL FIELD OF THE INVENTION

This invention relates to the field of telecommunications, and more particularly to a distributed telecommunication network.

BACKGROUND OF THE INVENTION

Historically, telecommunications have involved the transmission of voice and fax signals over a network dedicated to telecommunications, such as the public switched telephone network (PSTN) or a private branch exchange (PBX). Similarly, data communications between computers have also historically been transmitted on a dedicated data network, such as a local area network (LAN) or a wide area network (WAN). Currently, telecommunications and data transmissions are being merged into an integrated communication network using technologies such as Voice over Packet (VoP). Since many LANs and WANs transmit computer data using packet protocols, such as the Internet Protocol (IP), VoP uses this existing technology to transmit voice and fax signals by converting these signals into digital data and encapsulating the data for transmission over a packet-based network. This technology may be used to overcome some of the disadvantages associated with long distance telecommunications using the PSTN.

SUMMARY OF THE INVENTION

According to the present invention, disadvantages and problems associated with previous telecommunication systems and methods have been substantially reduced or eliminated.

According to one embodiment of the present invention, a telecommunication device includes a first interface coupled to the public switched telephone network (PSTN) in a first local calling area, a second interface coupled to a packet network, and a third interface coupled to a first plain old telephone system (POTS) telephony device. The device also includes a router that directs telecommunications between the first, second, and third interfaces and a gateway that enables telecommunications between the first POTS telephony device and the packet network. Furthermore, the device includes a processor that receives signaling from the first POTS telephony device indicating a desire to establish telecommunications with a second POTS telephony device coupled to the PSTN in a second local calling area and coupled to the packet network. The processor determines whether the telecommunication device has an appropriate amount of associated credit to use the packet network to establish telecommunications between the first and second POTS telephony devices and, if so, establishes telecommunications between the first and second POTS telephony devices using the packet network such that the first and second POTS telephony devices may communicate without using a long distance network coupling the first and second local calling areas.

Particular embodiments of the present invention provide one or more of the following technical advantages. For example, embodiments of the present invention provide long distance telecommunications using packet-based communications without the requirement of a packet telephony service provider (such as an Internet telephony service provider) or any additional costs beyond those of the typical Internet service provider. Furthermore, embodiments of the present invention also provide a mechanism for an efficient and cost-effective transition between the circuit-switched telephony infrastructure of the past and the packet telephony infrastructure of the future. For example, particular embodiments implement a distributed packet telephony system that reduces or eliminates the need for the use of the long distance networks of the PSTN and encourages the transition of the local PSTN to a packet-based infrastructure. Such a system may be implemented using relatively low-cost devices located in user's homes and businesses. Other important technical advantages are readily apparent to those skilled in the art from the following figures, descriptions and claims.

BRIEF DESCRIPTION OF THE DRAWINGS

To provide a more complete understanding of the present invention and the features and advantages thereof, reference is made to the following description taken in conjunction with the accompanying drawings, in which:

FIG. 3 illustrates an exemplary user site profile table in accordance with one embodiment of the present invention.

DETAILED DESCRIPTION OF THE INVENTION

Figure 1:
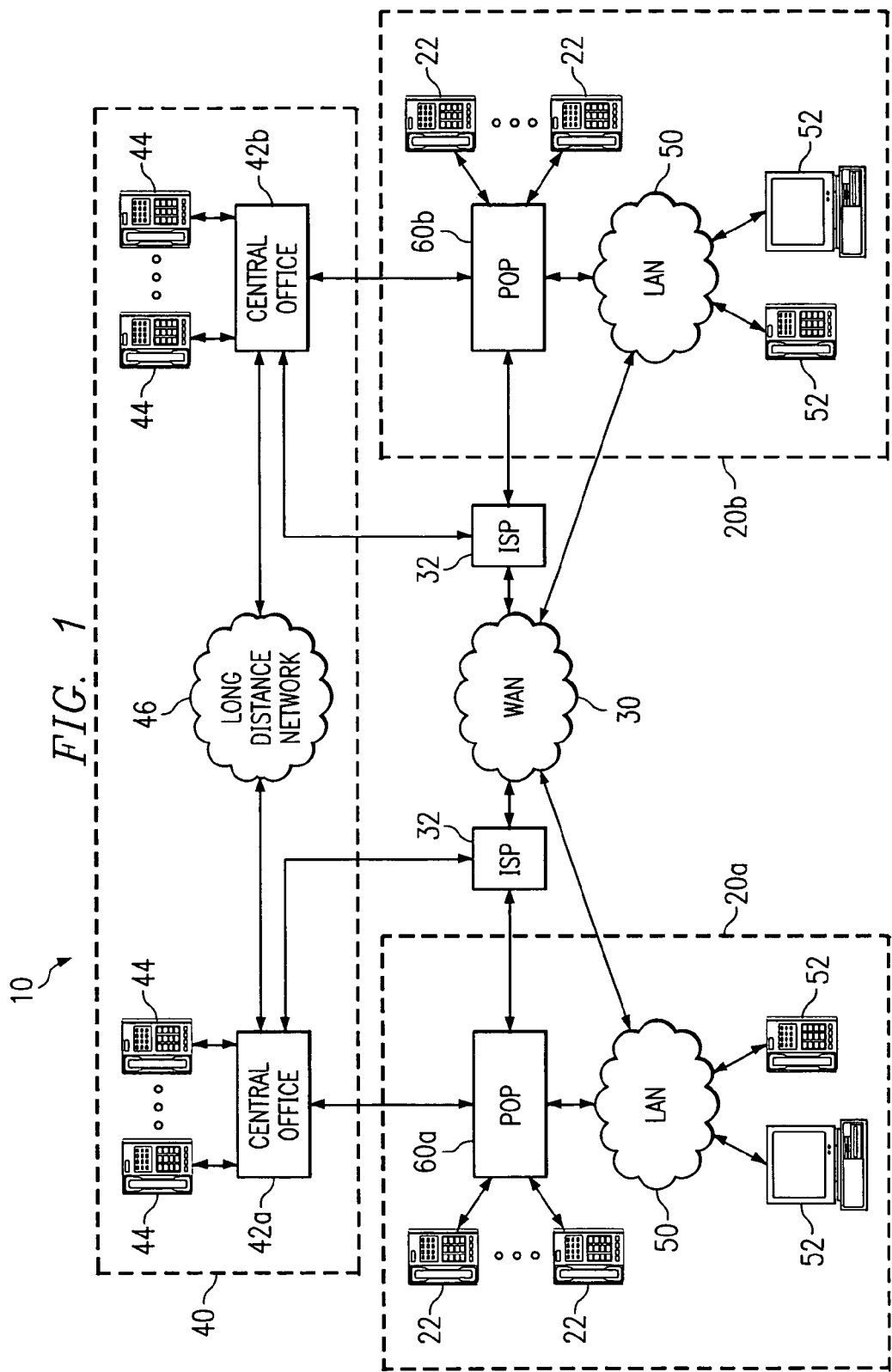
FIG. 1 illustrates an exemplary communication network in accordance with one embodiment of the present invention.

FIG. 1 illustrates an exemplary communication network 10. In the illustrated embodiment, communication network 10 includes a number of user sites 20 coupled using a wide area network (WAN) 30 and the public switched telephone network (PSTN) 40. Devices at user sites 20 may communicate using WAN 30 and/or PSTN 40. Traditionally, WAN 30 has been used for data communications and PSTN 40 has been used for voice, video, fax, and other related communications ("telecommunications"). Accordingly different pricing structures have been established for these different types of communications. However, as technologies have developed to merge telecommunications and data communications, these pricing structures have become outdated. Therefore, embodiments of the present invention leverage the convergence of data communications and telecommunications to establish a novel technique for providing telecommunications using a data communications pricing structure.

WAN 30 includes one or more computer data networks that are capable of transmitting data communication signals and telecommunication signals (in the form of data). In particular embodiments, WAN 30 is the Internet or any other appropriate network using Internet Protocol (IP). However, WAN 30 may be any type of network that allows the transmission of data and telecommunication signals. Therefore, although subsequent description will primarily focus on IP communications, it should be understood that other appropriate methods of transmitting telecommunications over a data network, such as a Frame Relay, asynchronous transfer mode (ATM), or other "packet"-based network, are also included within the scope of the present invention.

PSTN 40 includes switching stations, central offices, mobile telephone switching offices, pager switching offices, remote terminals, and other related local and long distance telecommunication equipment. For example, central offices (COs) 42 couple plain old telephone system (POTS) telephones 22, 44 to other local telephones 22, 44 and to remote telephones 22, 44 (using a long distance network 46). The term "telephone" is used to refer to any appropriate telephony device capable of performing telecommunications. The term "local telephone" may refer to telephones 22, 44 that are in the same local calling area and thus may communicate without the use of long distance network 46 and without incurring long distance fees or metered/measured call units. The term "remote telephone" may refer to telephones 22, 44 that are not in the same local (or "flat rate") calling area and thus may communicate using long distance network 46.

Central offices 42 in different local calling areas are coupled using long distance network 46 so as to allow communication between telephones 22, 44 in different local calling areas that are coupled to central offices 42. For example, long distance network 46 may be used for telecommunications between telephones 22, 44 in different local access and transport area (LATAs) (typically referred to as inter-LATA communications). Long distance network 46 also includes networks that are used for "non-local" intra-LATA telecommunications (for example, telecommunications that incur charges in addition to the flat rate paid by subscribers for local telephone service). The entity or entities that own the communication links comprising long distance network 46 typically charge a fee for the use of these links. For example, a user of a telephone 22, 44 may have an agreement with a long distance carrier to provide long distance services at a particular cost per minute (which may differ based on when a telephone call is made). Furthermore, other pricing schemes may be used (such as the use of metered or measured call units).

As described above, WAN 30 and PSTN 40 may enable communications to and from user sites 20. User sites 20 may include a number of devices to facilitate such communications. For example, user sites 20 may include one or more POTS telephones 22 that may be used for telecommunications. Furthermore, user sites 20 may include a local area network (LAN), such as an Ethernet network, that includes one or more LAN devices 52, such as computers and LAN telephones (for example, IP telephones). In particular embodiments, LAN 50 uses a communication protocol (such as Ethernet) that supports IP communications with an IP WAN 30; however, any other appropriate LAN communication protocols may be used. In particular embodiments, user sites 20 may not include a LAN 20. In such embodiments, user sites 20 may include one or more stand-alone computing and/or communication devices that may communicate with WAN 30 (for example, a stand-alone computer or a stand-alone IP telephone).

User sites 20 further include a PSTN point-of-presence (POP) 60 that may be used to couple POTS telephones 22, LAN 50 and LAN devices 52 (or similar stand-alone devices), WAN 30, and PSTN 40. POP 60 may include a router and/or a switch that directs communications to and from telephones 22 and LAN devices 52 to WAN 30 or PSTN 40 as appropriate. Furthermore, as is described in further detail below, POP 60 facilitates telecommunications between a remote user site 20 and a local central office 42 using WAN 30 such that the remote user site 20 is not charged for use of long distance network 46. POP 60 may be coupled to WAN 30 through the use an interne service provider (ISP) 32 or similar entity. ISP 32 provides a WAN POP through which devices at user site 20 may gain access to the Internet or other WAN 30. In particular user sites 20, POP 60 may be coupled to ISP 32 using PSTN 40 (for example, ISP 32 may be "co-located" in a central office 42). Furthermore, in particular user sites 20, POP 60 or LAN 50 may be directly connected to WAN 30 without the use of an ISP 32. A user associated with each user site 20 typically pays a fixed monthly fee to ISP 32 for unlimited communications to and from WAN 30. If POP 60 or LAN 50 is coupled directly to WAN 30, then the user may pay to lease all or part of the communication links used for such a direct connection. In such cases, the user often pays a fixed monthly or annual fee and/or the user may pay for the amount of bandwidth used.

Therefore, different pricing structures are typically used for communications using WAN 30 and long distance network 46. For example, a user may be charged a relatively low fixed price per month for unlimited access to WAN 30, but may be charged a fee for every minute that the user communicates using long distance network 46. These different pricing structures may exist even though WAN 30 and long distance network 46 may share many common communication links. For example, much of long distance network 46 may be leased to ISPs 32 and other entities for data communications since long distance network 46 typically includes communication networks, such as ATM networks, that are capable of carrying IP or other data traffic.

IP networks and other packet-based networks transmit data by placing the data (which may include voice, video, and fax telecommunication data) in packets and sending each packet individually to the selected destination. Unlike a circuit-switched network (like PSTN 40), dedicated bandwidth is not required for the duration of a packet-based telecommunication transmission using WAN 30. Instead, each network device communicates packets across the network as they become available for transmission. This disparity in the required bandwidth for packet-based and circuit-switched telecommunications is one reason that these two different types of telecommunications are priced differently. The present invention helps to resolve these inconsistencies by using WAN 30 to communicate long-distance telecommunications. As described below, such telecommunications may be communicated as data and thus be priced as typical data communications over WAN 30. Therefore, a telephone call or other telecommunication that would typically be communicated using long distance network 46 at a per minute charge may be communicated using WAN 30 for the same fixed monthly fee that is charged for data communications.

The technology that allows telecommunications to be transmitted over an IP network (as well as other packet-based networks) may be referred to as Voice over Packet (VoP) (one example of which is Voice over IP). IP telephones and other IP telephony devices 52 have the capability of encapsulating a user's voice or other media inputs into IP packets so that the inputs may be transmitted over WAN 30 and LANs 50. IP telephony devices 52 may include telephones, fax machines, computers running telephony software (such as "soft phones" or conferencing applications), H.323-compatible devices, or any other device capable of performing telephony functions in an IP network.

For those telephony devices that do not have such capabilities, such as POTS telephones 22, 44, POPs 60 may include one or more gateways that convert analog or digital circuit-switched data transmitted by telephones 22, 44 and other PSTN devices to packetized data transmitted by WAN 30, and vice-versa. For example, if voice data packets are transmitted using WAN 30 to a POTS telephone 44, POP 60 retrieves the data contained in the incoming packets and converts this digital data to the analog or digital format used by the PSTN trunk that couples POP 60 to central office 42. Since the digital format for voice transmissions over an IP network is often different than the format used on the digital trunks of PSTN 40, the gateways provide conversion between these different digital formats, referred to as transcoding. Similarly, if voice data packets are transmitted using WAN 30 to a POTS telephone 22, POP 60 retrieves the data contained in the incoming packets and converts this digital data to the analog or digital format used by POTS telephones 22. POP 60 also translates between the VoP call control system and the Signaling System 7 (SS7) protocol or other protocols used in PSTN 40.

In addition to these conversion functions, the POP 60 at each user site 20 serves as a PSTN access point that provides local PSTN access to remotely located user sites 20. Although only two user sites 20a and 20b are illustrated, the present invention contemplates any appropriate number of user sites 20 in any number of different geographic locations. For example, every PSTN customer location may potentially serve as a user site 20. In a particular embodiment, user sites 20a and 20b are located in different geographic areas such that a PSTN telephone call from a telephone 22 at user site 20a to a telephone 22 at user site 20b would incur charges for the use of long distance network 46. In such an embodiment, these long distance charges may be eliminated through the use of POPs 60 and WAN 30.

In operation, a user of a telephone 22 at user site 20 places a call to the telephone number assigned to a telephone 22 at user site 20b (or any POTS telephone 44 coupled to central office 42b or otherwise located in the same local calling area as user site 22b). Since the originating telephone 22 is coupled to POP 60a, POP 60a (the "originating POP") intercepts the call and determines that the call is directed to a destination telephone located in an area where there is another POP 60 (a "destination POP"). Therefore, originating POP 60a directs the telecommunications over WAN 30 to user site 20b and makes the necessary conversions to communicate the telecommunications from telephone 22 using WAN 30, as described above. Destination POP 60b receives the telecommunications, makes the necessary conversions, and directs the call to the destination telephone (for example, a telephone 22 at user site 20b, a telephone 44 coupled to central office 42b, or any telephone 44 coupled to PSTN 40 in the local calling area of user site 20b). Therefore, telecommunications between remote telephones may be completed without the use of long distance network 46. Exemplary methods for conducting such communications are described in further detail below.

Figure 2:
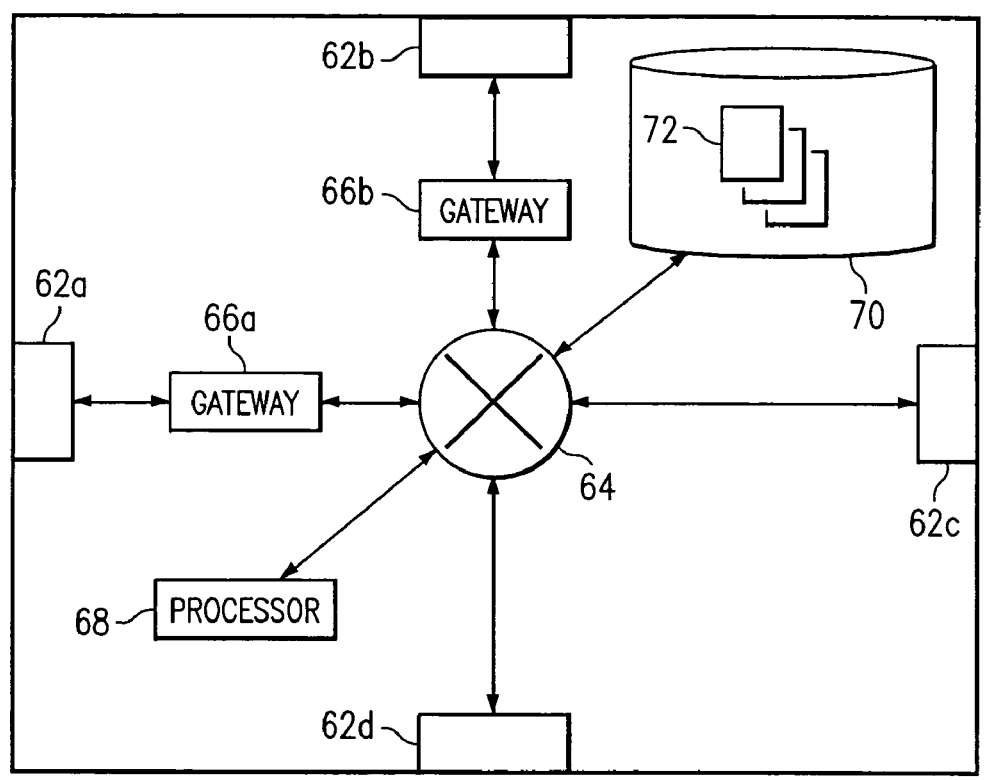
FIG. 2 illustrates an exemplary public switched telephone network point-of-presence (PSTN POP) in accordance with one embodiment of the present invention.

FIG. 2 illustrates an exemplary POP 60. POP 60 includes a number of interfaces 62 for coupling POTS telephones 22 and LAN devices 52 (or stand-alone computing devices 52) to WAN 30 and PSTN 40. For example, interface 62a may be used to couple one or more POTS telephones 22 at user site 20 to POP 60. Interface 62a may be a foreign exchange station (FXS) interface or any other appropriate interface to POTS phones 22. Interface 62b may be used to couple POP 60 to PSTN 40. Interface 62b may be a foreign exchange office (FXO) interface or other POTS interface, an ISDN interface or other digital interface, a cellular, satellite, or other wireless interface, and/or any other appropriate interface to PSTN 40. Interface 62c may be used to couple POP 60 to WAN 30 (directly, through an ISP 32, or in any other appropriate manner). Interface 62c may be an analog modem and associated jack for connection to a POTS telephone line coupling POP 60 and ISP 32, a digital modem such as a digital subscriber line (DSL) or cable modem coupling POP 60 and ISP 32, or any other appropriate interface for coupling POP 60 to WAN 30. Interface 62d may be used to couple POP 60 to LAN 50 or one or more stand-alone computing devices. Interface 62d may include a LAN interface (such as an Ethernet interface) or any other appropriate interface.

POP 60 further includes a router 64 that communicates data or telecommunications from one interface 62 to one or more other appropriate interfaces 62. Although the term "router" is used, any other appropriate component for performing this function may be used, including but not limited to, a switch, hub, bridge, brouter, routing switch, or switching hub. Since router 64 is used to couple devices and networks using different communication techniques, POP 60 also includes gateways 66 that may be used to convert communications from packet-based networks such as WAN 30 and LAN 50 to an appropriate format for communication to PSTN 40 or a POTS telephone 22.

The operation of router 64 and/or gateways 66 may be controlled using a processor 68. Processor may execute software and access data that is stored in a data storage device 70 associated with POP 60. Data storage device 70 may include any appropriate component or components for storing information, including but not limited to, random access memory (RAM), read-only memory (ROM), flash memory, magnetic storage devices and associated media, and optical storage devices and associated media. Storage device 70 may include software for establishing and maintaining telecommunications between devices and/or networks coupled to interfaces 62. Furthermore, storage device 70 may include one or more tables 72 including information that may be used to establish such telecommunications. For example, storage device may be used to store a table 72 that associates a list of numbers that are in the local calling area of each user site 20. Such a table may be used to direct a telecommunication from one user site 20 to another appropriate user site 20.

The various components of POP 60 may be implemented using any appropriate combination of hardware and/or software at one or more locations. Furthermore, although POP 60 is illustrated as a stand-alone device, software and/or hardware used to implement the components of POP 60 may be included in or added to a computing device, such as a personal computer, associated with a user site 20. For example, appropriate software and/or hardware may be added to a LAN computer 52 to implement POP 60. In such a case, processor 68 and/or data storage device 70 may be existing components of the computer 52.

The tasks associated with providing telecommunications using POPs 60 may be divided into two generic functions. The first function is to provide local access to PSTN 40 to remote user sites 20. This function is typically performed by the components of POPs 60. The second function is to manage the use of POPs 60 and the establishment of telecommunications using POPs 60. This second function may be performed by POPs 60, ISPs 32, and/or other third parties. For example, the information used to establish and manage local PSTN access using POPs 60 may be stored at POPs 60. In such embodiments, POPs 60 may be part of a peer-to-peer network and exchange information that allow POPs 60 to perform the management function. In other embodiments, the management function may be performed by a third party, such as an ISP 32 or other appropriate entity. In these embodiments, the information used to establish and manage local PSTN access using POPs 60 may be stored by the third party in one or more locations. It certain circumstances, it may be most efficient for one or more ISPs 32 to provide the management function since ISPs may already provide management functions for user sites 20 and thus have the facilities to store and access user information. Alternatively, the management function may generate a market for third-party facilitators.

FIG. 3 illustrates an exemplary user site profile table 100 that may be used to manage telecommunications using POPs 60. Table 100 may be a table 72 stored at POPs 60 or stored in any other appropriate location, as described above. Furthermore, although illustrated as a single table 100, the information in table 100 may be stored in one or more tables stored at one or more locations. Table 100 includes information that may be used to choose an appropriate destination POP 60 and to determine limitations that may be placed on telecommunications using the destination POP 60. The information relating to a particular POP 60 in table 100 may be communicated by the particular POP 60 to each of the other POPs 60 or to one or more central repositories (such as ISPs 32) when the particular POP 60 is coupled to the packet network or at any other appropriate time. The devices receiving the information may then add the information to table 100.

Table 100 my include a user identifier (ID) 102 associated with each user site 20. For example, user ID 102 may include an e-mail address of a user associated with each user site (which may be how an ISP 32 already identifies its users), an assigned user ID, or any other appropriate method of identifying each user site 20. Table 100 may also (or alternatively) include one or more telephone numbers 104 associated with POTS telephones 22 and/or LAN telephones 52 at each user site 20. These telephone numbers 104 may be used in addition to or instead of a user ID 102 to identify a user site 20. One or more of the telephone numbers 104 may have an associated indication 105 identifying the telephone number 104 as being associated with an IP or other packet-based telephone (such as a LAN telephone 52). Furthermore, telephone numbers 104 may be used to identify the local calling area of each user site 20. In particular embodiments, each telephone number 104 is associated with the other numbers that are included in the same local calling area as the user site telephone number 104. These associated local calling area telephone numbers may be included with each telephone number 104 in table 100 or one or more additional tables may be used to associated each telephone number with the other numbers in the same local calling area. In other embodiments, each local calling area in a country or other appropriate geographic region may be assigned a calling area ID. Each telephone number 104 may be associated with one or more calling area IDs in table 100 or otherwise. Each calling area ID may be associated with the telephone numbers in the calling area in one or more tables. Furthermore, any other appropriate techniques for associating a user site 20 and its POP 60 with one or more telephone numbers in the same local calling area may be used and are included within the scope of the present invention.

In addition, table 100 may include one or more network addresses 106 associated with the POP 60 located at each user site 20 (or with components of the POP 60). Network addresses 106 may be IP addresses or any other appropriate network addresses. Once an appropriate destination POP 60 has been determined (as described below), network addresses 106 allow an originating POP 60 to communicate with the destination POP 60 using WAN 30. Table 100 may further include an available access time 108 that indicates an amount of "credit" that a user has for use of other POPs 60. In particular embodiments, the use of POPs 60 for local PSTN access by users associated with user sites 20 may be based on a "sharing" principle. For example, a user site 20 may be credited a minute for each minute that the POP 60 at the user site 20 is used by other user sites 20 for local PSTN access. Alternatively, a user site 20 may be granted access time or other access privileges based on the amount of time that the user site 20 makes its POP 60 available (even though the POP 60 may not be used continuously while the POP 60 is, available). Any other appropriate technique may be used to allot access privileges to a user site 20. Furthermore, in particular embodiments, user sites 20 may be provided with unlimited use of other POPs 60 and available access time 108 may not be included in table 100.

Table 100 may also include various restrictions and/or rules regarding the use of the POP 60 associated with each user site 20. As examples only, table 100 may include access time restrictions 110, user access restrictions 112, and dialing rules 114. Access time restrictions 110 indicate the times when a POP 60 may or may not be used by other user sites 20. Access time restrictions 110 may be selected by a user associated with a user site 20 or may be generated for any other appropriate purpose. User access restrictions 112 may be used to identify particular users or user sites 20 that may or may not use the services of the POP 60 at a user site 20. Restrictions 110 may be used to limit access to known users or to prevent access by specific users. Restrictions 110 may also be used to limit access to particular groups or types of users (such as in-state or out-of-state user sites 20) for regulatory or legal reasons or for any other appropriate reason. Dialing rules 114 may be included in table 100 to indicate particular digits that should be prepended, appended, or otherwise added to or removed from a telephone number when placing a call to that telephone number using a particular POP 60. For example, a "9" may have to be dialed from a user site 20 to gain access to PSTN 40. Furthermore, an area code may be required in certain areas (typically large metropolitan areas) to make a local call. Any other appropriate dialing rules 114 may be included in table 110.

Although particular information is described as being included in table 100, table 100 or other related tables may include any other appropriate information for managing and establishing telecommunications over WAN 30 using POPs 60. Furthermore, the information included in table 100 or related tables may be expressed in any appropriate format.

Figure 4:
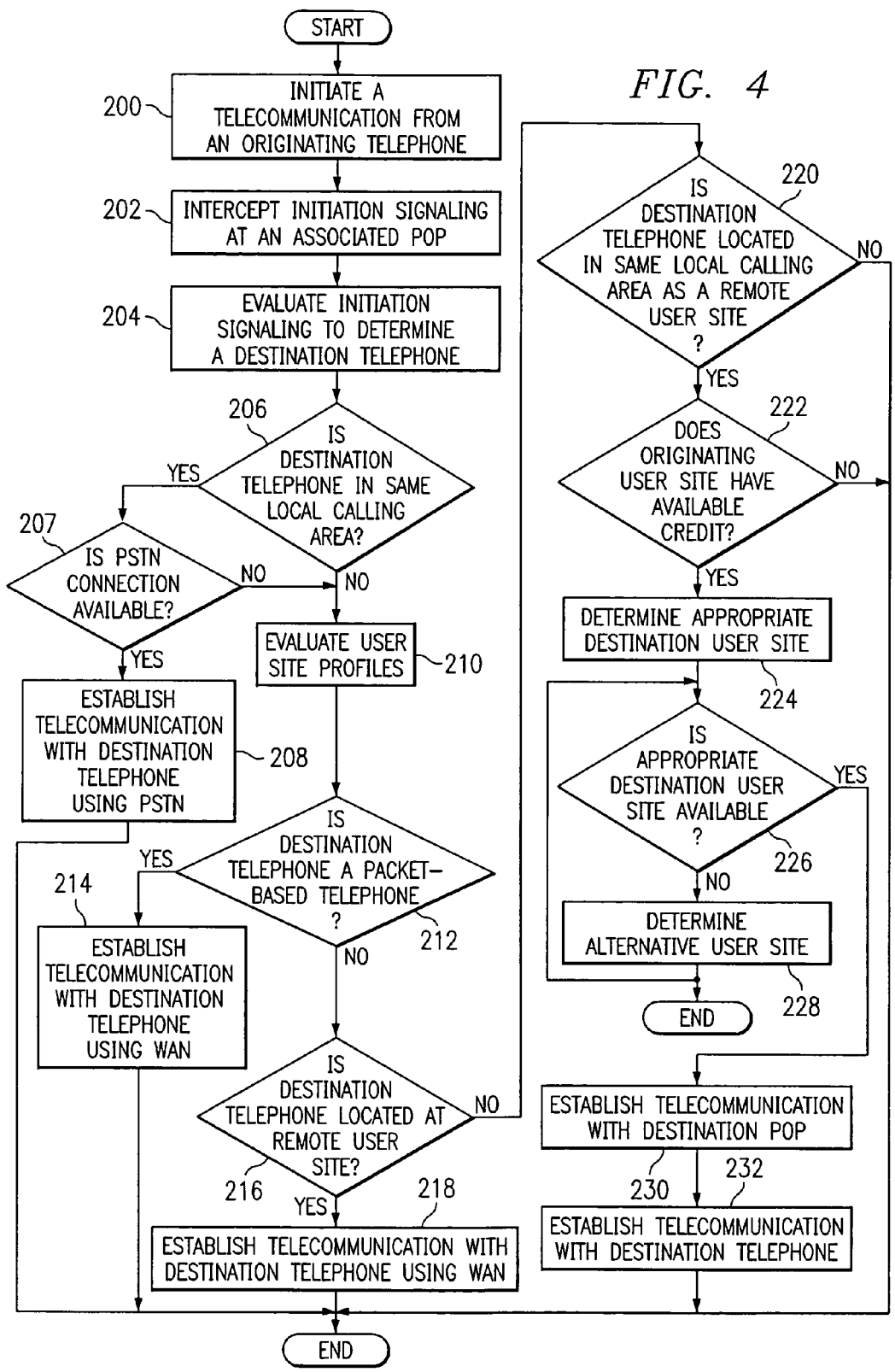
FIG. 4 illustrates an exemplary method for establishing telecommunications between a user site and an appropriate destination using PSTN POPs in accordance with one embodiment of the present invention.

FIG. 4 illustrates an exemplary method for establishing telecommunications between a user site 20 and an appropriate destination using POPs 60. The method begins at step 200 where a user initiates a telecommunication, such as a telephone call (including audio and/or video) or a fax, from a telephone associated with an originating user site 20, such as user site 20*a*. The telecommunication may be initiated using a telephone located at user site 20*a*, such as a POTS telephone 22 or an IP telephone 52, or any other telephone that has permission to originate calls from user site 20*a*. Such telephones may include telephones not included in a user site 20, such as a POTS telephone 44 or a cellular telephone. These external telephones may be associated with a user site 20 (for example, the cellular telephone may belong to a user of the user site 20) and may call into POP 60 at the user site 20 to initiate a communication with a remote POP 60. At step 202, POP 60*a* at user site 20*a* intercepts the signaling from the originating telephone used to initiate the telecommunication. For example, POP 60*a* may intercept dual tone multi-frequency (DTMF) tones communicated from the originating telephone and identifying a destination telephone. If the originating telephone is not directly coupled to POP 60*a*, then any appropriate communication techniques may be used to communicate with POP 60*a* and to indicate to POP 60*a* the destination of the desired telecommunication. For example, a user associated with user site 20a may call into POP 60a from a cellular telephone or POTS telephone 44 and provide signaling information once connected to POP 60a to indicate the desired destination.

Signaling or other communications from a POTS telephone 22 (received using interface 62a) or from a POTS telephone 44 or other telephone coupled to PSTN (received using interface 62b) may be manipulated by gateway 66a or 66b, respectively. This manipulation, as described above, may performed to convert the POTS or other communications from telephones 22, 44 to a format that may be processed by processor 68 and/or routed by router 64. For example, analog DTMF tones from a telephone 22 may be converted to digital signals for processing by processor 68. Any other appropriate conversions or other manipulations may also be performed.

At step 204, POP 60a evaluates the initiation signaling from the originating telephone to identify the destination telephone and its location. In particular embodiments, POP 60a may evaluate DTMF tones or other received signaling information to determine a telephone number of the destination telephone. Based on the telephone number or other identifying information POP 60a may determine the location of the destination telephone. For example, one or more telephone number tables stored at or accessible by POP 60a may identify the local calling area with which every telephone number is associated (or this information may be included in table 100). Alternatively, a telephone number table may identify the telephone numbers associated with the local calling area in which POP 60a is located.

At step 206, POP 60a determines whether the destination telephone is located in the same calling area as POP 60a. If so, POP 60a determines whether the connection to the local central office 42a (using interface 62b) is available at step 207. If the connection is unavailable, the method proceeds to step 210 (which is described below). If the connection is available, POP 60a establishes telecommunications between the originating telephone and the destination telephone using PSTN 40 at step 208. PSTN 40 is used since there is typically no additional charge for placing a call to a telephone in the same local calling area. Once POP 60a determines that PSTN 40 is to be used, POP 60a may simply pass telecommunications between the originating and destination telephones without manipulating the telecommunications using gateways 66. For example, gateway 66a may pass telecommunications without alteration between a telephone 22 coupled to interface 62a and central office 42a coupled to interface 62b. Alternatively, POP 60a may use gateways 66a and/or 66b to convert between analog telecommunications used by telephone 22 and digital communications used by central office 42 or to make any other appropriate conversions or manipulations. When the telecommunication is finished, the method ends.

If POP 60a determines at step 206 that the destination telephone is not located in the same calling area as POP 60a (or if the PSTN connection is unavailable, as described above), POP 60a may then access and evaluate user site profiles in a user site profile table 100 or other location at step 210. Alternatively, POP 60a may communicate information regarding the desired telecommunication to ISP 32 or any other third party and the ISP 32 or third party may manage the establishment of telecommunications using POPs 60. For the purposes of the following description, it will be assumed that user site profile information is stored at POPs 60 and that POPs 60 manage the establishment of telecommunications. However, it should be understood that one or more of the functions described below may be performed by appropriate components associated with an ISP 32 or other third party. Furthermore, POPs 60 or other appropriate components may access and evaluate user profile information at any appropriate time and not necessarily at (or only at) the exemplary step 210.

Based on the user profile information (such as indications 105 identifying that the destination telephone number is associated with an IP or other packet-based telephone) or based on any other appropriate information (including information in the signaling from the originating telephone), POP 60a determines at step 212 whether the destination telephone is a packet-based telephone. If so, POP 60a establishes telecommunications between the originating telephone and the destination telephone using WAN 30 at step 214. Since the destination telephone is a packet-based telephone, there is no need to use a remote POP 60 for local access to the PSTN in the local calling area where the destination telephone is located. If the destination telephone is coupled to WAN 30 through a remote POP 60, then the remote POP 60 may be used to route the telecommunications to the packet-based telephone (and the network address of the remote POP may be included in user profile table 100). For example, the destination telephone may be an IP telephone 52 coupled to WAN 30 using POP 60b. If POP 60b is used in this situation, the originating user site 20a may not be charged "credits" for this telecommunication since POP 60b is not being used for local PSTN access. Alternatively, such an IP telephone 52 may be coupled to WAN 30 without using POP 60b (for example, IP telephone 52 may be coupled to a LAN 50 that is coupled to WAN 30).

POP 60a may be used to provide appropriate call set-up and gateway functions. For the purposes of example, it is assumed that the originating telephone is a POTS telephone 22 coupled to interface 62a of POP 60a and the destination telephone is an IP telephone 52 coupled to interface 62c of POP 60b using LAN 50. POP 60a may determine whether the IP telephone 52 is available and, if so, set up the telecommunication by instructing gateway 66a to set up an audio stream with IP telephone 52 using WAN 30. The telecommunication may be established and maintained using H.323 (and its related protocols) or using any other appropriate protocols. Telecommunications received from POTS telephone 22 are then digitized (using a codec and/or other appropriate components) and encapsulated for transmission using WAN 30. The encapsulation may be performed by Real-Time Transport Protocol (RTP) running over UDP (User Datagram Protocol) or using any other appropriate protocols. The UDP packets are then communicated to router 64 which direct the packets to WAN 30 for communication to IP telephone 52 (possibly via POP 60b). A gateway 66 of POP 60b does not need to be used since the destination telephone is a packet-based telephone. The operation of VoP telecommunications is well known in the art and will not be described in further detail. When the telecommunication between the originating telephone and the destination packet-based telephone is completed, the method ends.

If POP 60a determines at step 212 that the destination telephone is not a packet-based telephone, POP 60a determines at step 216 if the destination telephone is located at a remote user site 20 (for example, a POTS telephone 22 at user site 20b). If so, POP 60a establishes telecommunications between the originating telephone and the destination telephone using WAN 30 and the remote POP 60. Such telecommunications may be established in a similar manner as described above with reference to step 214. However, gateway 66a of the remote POP 60 is typically used to communicate the packet telecommunications to a non-packet telephone at the remote user site.

For example, if the originating telephone is a POTS telephone 22 at user site 20a and the destination telephone is a POTS telephone 22 at user site 20b, gateway 66a of POP 60a may receive analog telecommunications from originating telephone 22 and convert the telecommunications for communication using WAN 30. Gateway 66a of POP 60b may then receive the packet telecommunications and convert the telecommunications as appropriate for destination telephone 22 at user site 20b. This process is performed in reverse for telecommunications from destination telephone 22 to originating telephone 22. As with telecommunications to a packet-based telephone, a user associated with a user site 20 may not be charged credits for telecommunications to a POTS telephone 22 or other non-packet telephone associated with a remote user site 20 since the remote POP 60 is not being used for local PSTN access.

If POP 60a determines at step 216 that the destination telephone is not located at a remote user site 20, POP 60a determines at step 220 whether the destination telephone is located in the same local calling area as a remote user site 20. POP 60a may make such a determination using the information included in user profile table 100 or other any other appropriate information identifying the local calling areas of one or more user sites 20. For example, POPs 60 may subscribe to a "subject group" associated with a particular local calling area and POP 60a may determine if there is a subject group associated with the local calling area of the destination telephone. If POP 60a determines that there are no user sites 20 in the local calling area of the destination telephone, then the exemplary method ends. Alternatively, system 10 may be configured to determine a remote POP 60 that may be used to access PSTN 40 in a different local calling area than the destination telephone, but in a local calling area from which telecommunications with the destination telephone are less expensive than from the local calling area of the originating telephone.

If POP 60a determines at step 220 that there are one or more user sites 20 in the local calling area of the destination telephone, POP 60a determines at step 222 whether the user associated with POP 60a has available credit to establish a telecommunication with the remote user site 20. As described above, this information may be included in user profile table 100. If the user does not have an appropriate amount of credit, the method ends. If the user has an appropriate amount of credit, POP 60a determines an appropriate destination user site 20 through which local PSTN access may be obtained at step 224. For example, POP 60a may search a list of user sites 20 in the local calling area of the destination telephone to determine a user site 20 that allows the user associated with user site 20a to establish a telecommunication at the particular time (for example, by evaluating access time restrictions 110, user access restrictions 112, and/or any other appropriate criteria). When an appropriate destination user site 20 is identified, POP 60a communicates with the POP 60 associated with the user site 20, such as POP 60b of user site 20b, at step 226 to determine if user site 20b is available. For example, POP 60b may only be able to establish a single connection to PSTN 40. Therefore, POP 60a may determine if another POP 60 or other component is already using POP 60b for local PSTN access.

If POP 60b is unavailable for this or any other appropriate reason, POP 60a determines an alternative appropriate user site 20 at step 228 and the method returns to step 226. If no there are no alternative user sites 20, the exemplary method ends. Alternatively, as described above with reference to step 220, user sites 20 in non-local calling areas may be used. If POP 60a determines at step 226 that an appropriate destination user site 20, such as user site 20b, is available, POP 60a establishes telecommunications with the destination POP 60b at step 230. For example, POP 60a may indicate to POP 60b the destination telephone number to which telecommunications from POP 60a are to be communicated and establish audio streaming between POPs 60a and 60b.

POP 60b establishes telecommunications with the destination telephone at step 232. For example, gateway 66b of POP 60b may communicate the destination telephone number to central office 42b and establish a circuit-switched telecommunications channel between gateway 66b and the destination telephone, for example a POTS telephone 44. Telecommunications received at POP 60b from POP 60a (telecommunications from a telephone 22 or other telephone associated with user site 20a) are routed to gateway 66b of POP 60b. Gateway 66b performs any appropriate conversions and forwards the telecommunications to the destination telephone 44. Similarly, telecommunications from the destination telephone 44 are communicated to gateway 66b of POP 60b, converted by gateway 66b and communicated to gateway 66a of POP 60a using WAN 30, and converted by gateway 66a and communicated to the originating telephone 22. Alternatively, if the originating telephone is an IP telephone 52 at user site 20a, then the packet telecommunications from gateway 66b of POP 60b may be communicated directly from POP 60a to IP telephone 52. Furthermore, if the originating telephone is a telephone associated with user site 20a but coupled to PSTN 40 (such as a telephone 44 coupled to central office 42a), then the packet telecommunications from gateway 66b of POP 60b may be communicated to and converted by gateway 62b of POP 60a and then communicated to the destination telephone using PSTN 40. When the telecommunication between the originating telephone and the destination telephone is completed, the method ends.

Although an exemplary method is illustrated and described, the present invention contemplates using any suitable techniques and components for providing local PSTN access through the use of POPs 60. Moreover, many of the steps in this flowchart may take place simultaneously and/or in different orders than as shown. In addition, the present invention contemplates using methods with additional steps, fewer steps, or different steps. Furthermore, although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A telecommunication device, comprising:
    a first interface coupled to the public switched telephone network (PSTN) in a first local calling area;
    a second interface coupled to a packet network;
    a third interface coupled to a first plain old telephone system (POTS) telephony device;
    a router coupling the first, second, and third interfaces and operable to direct telecommunications between the first, second, and third interfaces;
    a gateway operable to enable telecommunications between the first POTS telephony device and the packet network; and
    a processor operable to:

receive signaling from the first POTS telephony device indicating a desire to establish telecommunications with a second POTS telephony device coupled to the PSTN in a second local calling area and coupled to the packet network;

determine whether the telecommunication device has an appropriate amount of associated credit to use the packet network to establish telecommunications between the first and second POTS telephony devices; and establish telecommunications between the first and second POTS telephony devices using the packet network such that the first and second POTS telephony devices may communicate without using a long distance network coupling the first and second local calling areas.

2. The device of claim 1, wherein the signaling from the first POTS telephony device identifies a telephone number of the second POTS telephony device.

3. The device of claim 1, wherein the processor is further operable to evaluate restrictions in a profile table to determine whether telecommunications may be established with the second POTS telephony device using the packet network.

4. The device of claim 3, wherein the restrictions comprise access time restrictions.

5. The device of claim 3, wherein the restrictions comprise user access restrictions.

6. The device of claim 3, wherein the profile table is stored in a memory of the telecommunication device.

7. The device of claim 3, wherein the profile table is stored remotely from the telecommunication device.

8. The device of claim 1, wherein:
the packet network comprises an Internet Protocol (IP) network; and
the telecommunications comprise voice over IP (VoIP) telecommunications.

9. The device of claim 1, wherein:
the packet network comprises the Internet; and
the telecommunication device is coupled to the packet network using an Internet service provider (ISP).

10. A method for establishing telecommunications, comprising:
receiving signaling from a first plain old telephone system (POTS) telephony device at a telecommunication device coupled to a packet network and coupled to the public switched telephone network (PSTN) in a first local calling area, the signaling indicating a desire to establish telecommunications with a second POTS telephony device coupled to the PSTN in a second local calling area and coupled to the packet network;
determining whether a user of the first POTS telephony device has an appropriate amount of credit to use the packet network to establish telecommunications between the first and second POTS telephony devices; and
establishing telecommunications between the first POTS telephony device and the second POTS telephony device using the packet network, such that the first and second POTS telephony devices may communicate without using a long distance network coupling the first and second local calling areas.

11. The method of claim 10, further comprising converting telecommunications received from the first and second POTS telephony device for communication using the packet network.

12. The method of claim 10, wherein the signaling from the first POTS telephony device identifies a telephone number of the second POTS telephony device.

13. The method of claim 10, further comprising evaluating restrictions in a profile table to determine whether telecommunications may be established using the packet network.

14. The method of claim 13, wherein the restrictions comprise access time restrictions.

15. The method of claim 13, wherein the restrictions comprise user access restrictions.

16. The method of claim 13, wherein the profile table is stored in a memory of the telecommunication device.

17. The method of claim 13, wherein the profile table is stored remotely from the telecommunication device.

18. The method of claim 10, wherein:
the packet network comprises an Internet Protocol (IP) network; and
the telecommunications comprise voice over IP (VoIP) telecommunications.

19. The method of claim 10, wherein:
the packet network comprises the Internet; and
the telecommunication device is coupled to the packet network using an Internet service provider (ISP).

20. Logic for establishing telecommunications embodied in a computer-readable medium and operable to:
receive signaling from a first plain old telephone system (POTS) telephony device at a telecommunication device coupled to a packet network and coupled to the public switched telephone network (PSTN) in a first local calling area, the signaling indicating a desire to establish telecommunications with a second POTS telephony device coupled to the PSTN in a second local calling area and coupled to the packet network;
determine whether a user of the first POTS telephony device has an appropriate amount of credit to use the packet network to establish telecommunications between the first and second POTS telephony devices; and
establish telecommunications between the first POTS telephony device and the second POTS telephony device using the packet network, such that the first and second POTS telephony devices may communicate without using a long distance network coupling the first and second local calling areas.

21. The logic of claim 20, further operable to convert telecommunications received from the first and second POTS telephony device for communication using the packet network.

22. The logic of claim 20, wherein the signaling from the first POTS telephony device identifies a telephone number of the second POTS telephony device.

23. The logic of claim 20, further operable to evaluate restrictions in a profile table to determine whether telecommunications may be established using the packet network.

24. The logic of claim 23, wherein the restrictions comprise access time restrictions.

25. The logic of claim 23, wherein the restrictions comprise user access restrictions.

26. The logic of claim 23, wherein the profile table is stored in a memory of the telecommunication device.

27. The logic of claim 23, wherein the profile table is stored remotely from the telecommunication device.

28. The logic of claim 20, wherein:
the packet network comprises an Internet Protocol (IP) network; and
the telecommunications comprise voice over IP (VoIP) telecommunications.

29. The logic of claim 20, wherein:
the packet network comprises the Internet; and
the telecommunication device is coupled to the packet network using an Internet service provider (ISP).

30. A system for establishing telecommunications, comprising:
means for receiving signaling from a first plain old telephone system (POTS) telephony device at a telecommunication device coupled to a packet network and coupled to the public switched telephone network (PSTN) in a first local calling area, the signaling indicating a desire to establish telecommunications with a second POTS telephony device coupled to the PSTN in a second local calling area and coupled to the packet network;

means for determining whether a user of the first POTS telephony device has an appropriate amount of credit to use the packet network to establish telecommunications between the first and second POTS telephony devices; and means for establishing telecommunications between the first POTS telephony device and the second POTS telephony device using the packet network, such that the first and second POTS telephony devices may communicate without using a long distance network coupling the first and second local calling areas.

\* \* \* \* \*